June 26, 1923.  W. RYAN  1,459,993
DEMOUNTABLE RIM
Filed May 21, 1921  2 Sheets-Sheet 1
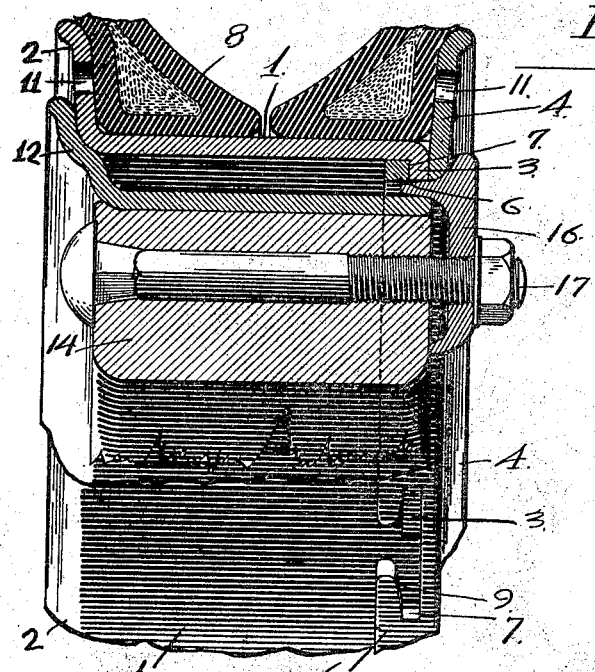
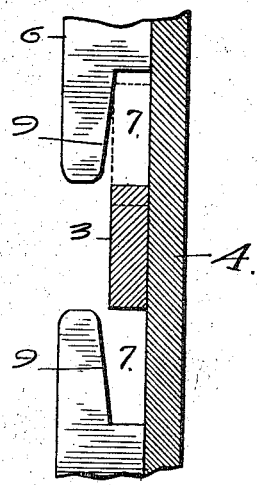
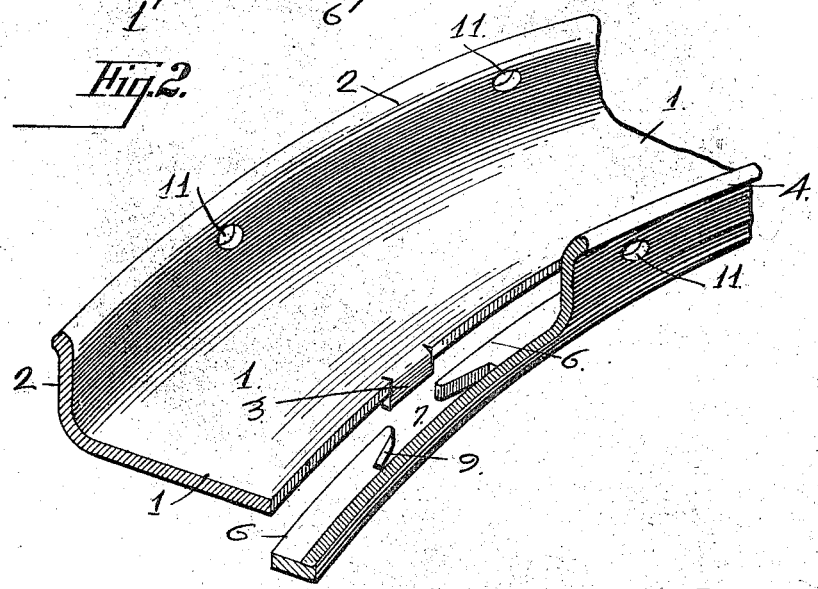
Inventor
William Ryan
By Arthur L. S. Lee
Atty June 26, 1923.

W. RYAN

DEMOUNTABLE RIM

Filed May 21, 1921

Inventor
William Ryan
By Arthur L. Slee.
Atty

Patented June 26, 1923.

1,459,993

UNITED STATES PATENT OFFICE.

WILLIAM RYAN, OF PASO ROBLES, CALIFORNIA.

DEMOUNTABLE RIM.

Application filed May 21, 1921. Serial No. 471,426.

*To all whom it may concern:*

Be it known that I, WILLIAM RYAN, a citizen of the United States, residing at Paso Robles, county of San Luis Obispo, and State of California, have invented a new and useful Improvement in a Demountable Rim, of which the following is a specification.

My invention relates to improvements in demountable rims for motor vehicles and the like wherein a continuous rim having a flange thereon operates in conjunction with a second flange detachably connected therewith to form an annular channel to receive a tire.

The primary object of the present invention is to provide a new and improved demountable rim for motor vehicles and the like.

Another object of the present invention is to provide a new and improved device of the character set forth having improved means for easily and readily connecting and disconnecting a pair of annular flanges to facilitate removal and placement of a tire or the like.

A further object of the present invention is to provide a new and improved demountable rim for motor vehicles and of the type set forth which may be easily and cheaply constructed, of few parts and having a maximum efficiency.

I accomplish these several and other objects by means of the improved device disclosed in the drawings forming a part of the present specification wherein like characters of reference are used to designate similar parts throughout the said specification and drawings, and in which:

Fig. 1 is a broken transverse sectional view taken through the felloe and rim disclosing the manner in which the same is assembled and held in position upon a motor vehicle wheel.

Fig. 2 is a broken perspective view, partly in section, disclosing the relative position of the parts.

Fig. 3 is an enlarged broken sectional view of the T-shaped slots and the manner of engaging the lugs.

Figure 4:
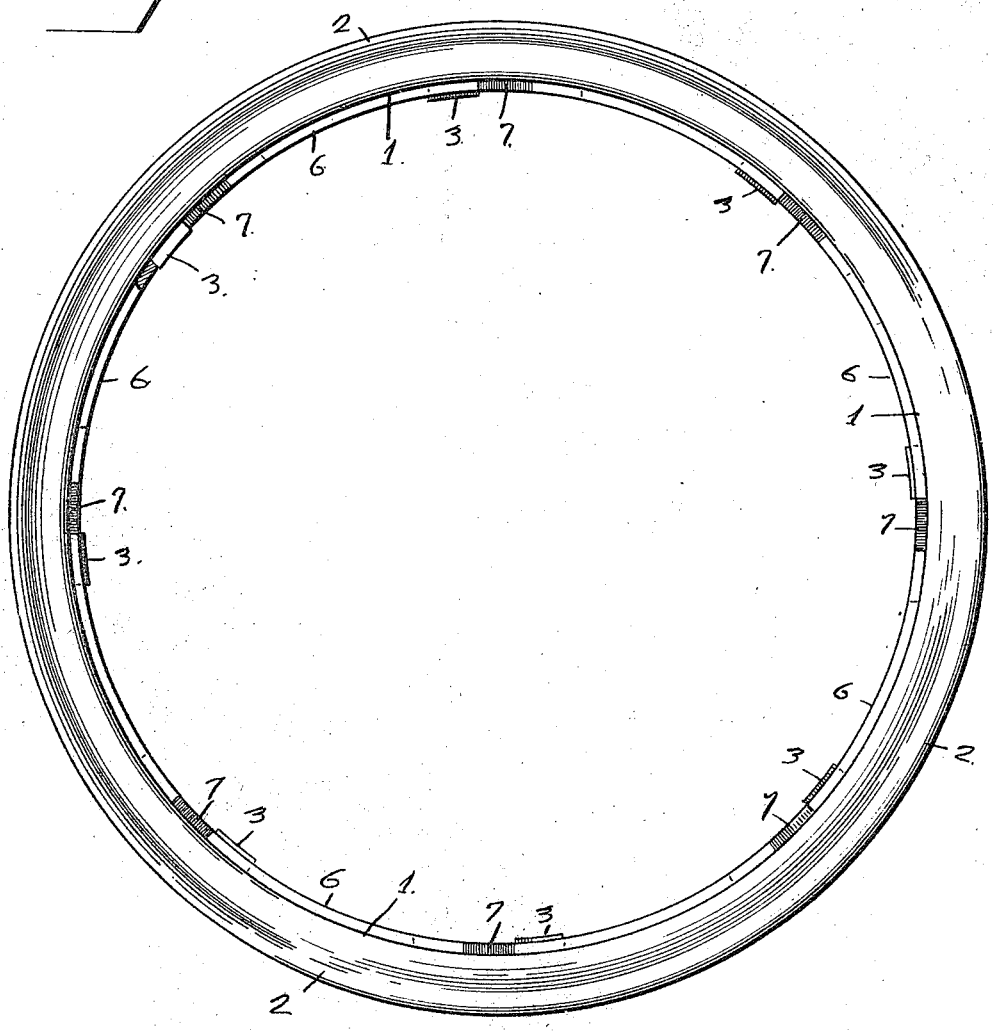
Fig. 4 is an elevation of the assembled device.

Referring to the drawings the numeral 1 is used to designate a continuous rim having an annular flange 2 formed integral with one edge and a plurality of inwardly projecting radial lugs 3 arranged at regular intervals on the opposite edge thereof.

A second flange 4, similar to the flange 2 on the ring 1, is provided with an inwardly projecting flange 6 having a plurality of regular spaced T-shaped slots 7 therein arranged to match with and engage the lugs 3 of the rim 1 to form an annular channel therewith to receive a tire 8, in a manner hereinafter more fully set forth.

The inner surfaces 9 of the extensions of the T-shaped slots 7 are preferably beveled or inclined as disclosed in Figs. 2 and 3 of the drawings whereby rotation of one flange 4 relatively to the flange 2 of the rim 1, when the lugs 3 are in said slots 7, will cause said beveled surfaces 9 to engage said lugs 3 and thereby tightly and rigidly connect said flange 4 with the ring 1 to form a rigid and unbroken channel to receive and effectively retain said tire or shoe 8.

The flanges 2 and 4 are also provided with apertures 11 whereby a suitable tool, not shown, may be inserted to facilitate such rotation for connecting and disconnecting the said flanges.

The connected ring 1 with its flange 2 and connected flange 4 are arranged to be seated upon a suitable felloe band 12 mounted upon the wheel 14, said ring 1 being firmly and rigidly held in such position by the usual clamps or wedges 16 which are actuated to tighten said ring 1 and its attached flange 4 firmly upon said wheel 14.

In removing a tire the flange 4 is rotated relatively to the rim 1 to disengage the lugs 3 from the beveled surfaces 9 of the T-shaped slots 7 and to move said lugs opposite the opening of said slots when the flange 4 may be easily and readily separated from the said ring 1.

No obstruction now existing, the tire or shoe 8 may be easily removed sidewise from the ring 1 and a new tire or shoe 8 positioned in place thereof, after which the flange 4 is again replaced and rotated in either direction to move the lugs 3 into engagement with either extension of the T-shaped slots 7 and into engagement with the beveled or inclined surfaces 9 thereof, thereby rigidly connecting the ring 1 and channels 2 and 4 to form a rigid annular channel to hold the tire or shoe 8 in position.

The clamps or wedges 16 are then tightened to rigidly secure the ring 1 and flange 4 in position upon the wheel 14.

By means of this novel arrangement the flange 4 may be rotated in either direction relatively to the ring 1 to engage or disengage the lugs 3 with the beveled surfaces 9 of the T-shaped slots 7, and by this simple process a continuous annular channel is formed which will effectively and properly hold the tire in position.

It should be noted then in assembling or disassembling this rim that there is no tendency to spring it out of a true round shape as is the case with split rims where one end must be forced over the other to remove the shoe. Consequently a more efficient rim is provided in the present instance which may be easily and readily assembled and disassembled and which may be cheaply and easily produced.

Having thus described my invention what I claim as new and desire to secure by Letters Patent is:

A demountable rim comprising a continuous ring having an annular flange on one side thereof and radially disposed lugs formed integral therewith on the opposite edge of said ring; and a member having an annular flange similar to the annular flange of the ring and provided with an inwardly projecting flange of a diameter adapted to fit within the ring, said inwardly projecting flange having slots formed in the edge thereof to engage the radially disposed lugs of the ring whereby said ring and inwardly disposed flange may be retained in overlapping relation with the edge of the ring abutting against the inner side of the annular flange to form an unbroken annular channel adapted to receive a tire.

In witness whereof I hereunto set my signature.

WILLIAM RYAN.